US011307002B2

(12) United States Patent
Assel

(10) Patent No.: US 11,307,002 B2
(45) Date of Patent: Apr. 19, 2022

(54) MISSILE WARNER AND METHOD FOR WARNING OF A MISSILE

(71) Applicant: HENSOLDT Sensors GmbH, Taufkirchen (DE)

(72) Inventor: Michael Assel, Kissing (DE)

(73) Assignee: HENSOLDT SENSORS GMBH, Taufkirchen (DE)

( * ) Notice: Subject to any disclaimer, the term of this patent is extended or adjusted under 35 U.S.C. 154(b) by 0 days.

(21) Appl. No.: 17/126,516

(22) Filed: Dec. 18, 2020

(65) Prior Publication Data

US 2021/0270575 A1 Sep. 2, 2021

(30) Foreign Application Priority Data

Dec. 18, 2019 (EP) ..................................... 19217531

(51) Int. Cl.
 *F41H 11/02* (2006.01)
 *G08B 21/18* (2006.01)

(52) U.S. Cl.
 CPC ........... *F41H 11/02* (2013.01); *G08B 21/182* (2013.01)

(58) Field of Classification Search
 CPC ........ F41H 11/02; G08B 21/182; G01S 3/783
 See application file for complete search history.

(56) References Cited

U.S. PATENT DOCUMENTS

| 4,399,464 A * | 8/1983 | Hix ...................... H04N 5/2176 348/164 |
| 6,079,665 A * | 6/2000 | Nella .................... F41G 7/2226 244/3.16 |
| 2002/0133294 A1 | 9/2002 | Farmakis et al. |
| 2010/0259607 A1 * | 10/2010 | Kennedy ............... F41G 7/2253 348/113 |
| 2011/0170087 A1 * | 7/2011 | Gidseg ................. G06K 9/3241 356/28 |
| 2012/0232867 A1 * | 9/2012 | Ahrens ............... F41H 13/0043 703/6 |
| 2017/0183104 A1 | 1/2017 | Colby |
| 2020/0080821 A1 | 3/2020 | Assel |

FOREIGN PATENT DOCUMENTS

| EP | 3591427 A1 | 1/2020 |
| WO | 2006/083278 A2 | 8/2006 |

OTHER PUBLICATIONS

European Patent Office Notice (Examination Report), dated May 4, 2020.

* cited by examiner

*Primary Examiner* — Hongmin Fan
(74) *Attorney, Agent, or Firm* — Patent Portfolio Builders PLLC

(57) ABSTRACT

A missile warner includes a sensor, a recording device, and an evaluation unit. The sensor is configured to detect a potential missile. The recording device is configured to continuously store detector data generated by the sensor, for a predefined amount of time. The evaluation unit is configured: to recognize within the detector data, a detection signal of the potential missile, and to compare the detection signal with a declaration threshold value, and to generate, after the detection signal has exceeded the declaration threshold value, a warning signal of the potential missile, and to perform, upon the presence of the warning signal, a verification of the potential missile based on a temporal backtracking of the corresponding detection signal, wherein the backtracking includes an analysis of the stored detector data.

11 Claims, 4 Drawing Sheets

MISSILE WARNER AND METHOD FOR WARNING OF A MISSILE

CROSS-REFERENCE TO RELATED APPLICATIONS

This application claims priority of application EP19217531 filed Dec. 18, 2019, which is hereby incorporated by reference.

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR A JOINT INVENTOR

Not Applicable

BACKGROUND OF THE INVENTION

Field of the Invention

The present invention relates to a missile warner, and to a method for warning of a missile, and in particular to a passive missile warner with backtracking.

Description of Related Art

Missile warners form a necessary part of self-protection systems (e.g. of aircraft), whose primary task lies in the detection and declaration of missiles. Because such missiles can pose a potential threat for the object to be warned (which in the following will be referred to as target object; this may be the carrier of the missile warner, or a third object), upon detection, a message is sent to an appropriate superordinate system in order to initiate corresponding countermeasures.

Passive missile warning systems may e.g. be based on optical signals—for example by detecting the hot exhaust plume of the missile. For this purpose, one or more spatially resolving cameras may be employed, each of which working in a special spectral range. Basically, such cameras detect all objects that are located in a detection area and have a signature in the spectral range of the camera. Among those, are often a large number of non-threatening sources, such as fire, lamps, or even missiles that would not hit the target object. However, the actual threat rather consists in missiles that are moving towards the target object, and may therefore in principle represent a threat.

A distinction between threatening sources and non-threatening sources (the verification) is performed by a classifier. For this task, characteristic features may be used (such as an intensity curve or some other characteristic signature) that belong to the respective source. Ideally, as a result of the classification, only actual threats are recognized and reported for further countermeasures to a corresponding self-protection system of the target object and or the pilot (declaration).

When adjusting the classifier, a compromise must typically be found between a low false alarm rate (FAR) and a maximal probability of declaration (POD) of a threat.

FIG. 3 illustrates the schematic relation between the false alarm rate (FAR) and the probability of declaration (POD) of a threat. A first graph 310 represents non-threatening objects that have incorrectly led to declaring an alarm. The graph 310 represents the false alarm rate (FAR). A second graph 320 shows the probability (1-POD) that an actually threatening object is incorrectly not declared as an alarm. For the declaration, a threshold value is used, wherein a first lower threshold value (e.g. at 30%) triggers a pre-alarm and a second higher threshold value (e.g. at 70%) triggers an alarm. If the threshold value were equal to zero (on the left side of the illustration), all objects would trigger an alarm. This means that in particular all harmless objects trigger an alarm/pre-alarm. As the threshold value increases, the FAR falls (see first graph 310) and the value for the probability (1-POD) (second graph 320) increases. A threshold value of 100 (as a percentage of the value range of the sensor signals) means that all objects are declared as non-threatening. As the threshold value falls, there are fewer and fewer dangerous objects for which no warning is issued (see second graph 320).

The higher the declaration threshold, the lower the false alarm rate. At the same time, however, there is also an increase in the probability that an actual threat will be incorrectly interpreted as a false alarm, and will therefore be suppressed. Correspondingly, a case where the declaration threshold is selected too low leads to a large number of false alarms—although with a high probability that an actual threat will be detected.

If the possible countermeasures are limited, it is always advantageous to avoid high false alarm rates, as otherwise, there is a risk that countermeasures will no longer be available in the event of an actual threat. Exceptions to this would be countermeasures that are not depleted, such as in so-called DIRCM (direct infrared counter measures) systems. If a target object is protected by such systems, a higher false alarm rate for a missile warning may be acceptable, which may then be beneficial for a warning time or for the POD. This can be taken into account, for example, by utilizing suitable pre-warnings. With a low declaration threshold, such pre-warnings result in a shorter declaration time and/or in a higher POD at a higher FAR.

Besides the detection of hostile fire, e.g. such as by missiles, missile warners may also be used to detect enemy fire with non-propelled projectiles (HFI: Hostile Fire Indication). Depending on the spectral range, the muzzle flash, the hot bullet or, in case of tracer ammunition, the tracer are detected.

A known system is e.g. disclosed in U.S. Pat. No. 3,653,016, which combines a combination of a broadband solar cell detector with a UV-sensitive detector in serial connection, such that an event previously detected by the solar cell detector can be confirmed. However, the results for this system are not yet quite satisfactory.

Another known system is disclosed in EP 2911092 A1 (which is related to U.S. Pat. No. 10,410,082). This system includes one or more photodetectors for a detection, and a high-resolution camera for a verification and spatial localization, of lightning events. An integral attribute of this localization system is the generation of two data sets of detection signals—one from the photodetectors, and another from the camera. The spatial localization of a lightning event is thus carried out using two data sets, wherein by means of the first data set only an approximate determination of the position is performed, before the position of the lightning event must still be determined within the second data set.

By these systems, a warning of a missile, which includes the location and tracking of the instantaneous spatial position of the missile while it is still in flight and/or requires faster verification, is possible only to an inadequate extent.

Overall, there is a requirement for improved systems which do not have the above problems and offer a high level of security.

BRIEF SUMMARY OF THE INVENTION

At least some of the problems mentioned above are solved by a missile warner and a method as described in the claims. The claims describe advantageous further improvements included in the invention.

The present invention relates to a missile warner, and in particular to a passive missile warner. The missile warner comprises a sensor (e.g. a camera or an infrared sensor), a recording device (e.g. an electronic data storage), and an evaluation unit (e.g. a processor for electronic data processing). The sensor is configured to detect a potential missile (in a suitably selected spectral range). The recording device is configured for a continuous (e.g. rolling) storage of detector data of the sensor for a predefined amount of time (e.g. an expected flight time of a missile to be detected). The evaluation unit is configured to receive, in a pre-classification, from the sensor detector, data generated by the sensor, to recognize a detection signal (e.g. localized intensity maxima) of the potential missile in the detector data and compare the detection signal with a declaration threshold value, and to generate a warning signal (e.g. a pre-alarm) of the potential missile if the declaration threshold value has been exceeded. Furthermore, the evaluation unit is configured to carry out, in a classification and if a warning signal is present, a verification of the potential missile by temporal backtracking the associated detection signal over time, using the detector data stored in the recording device.

It is emphasized that, according to further embodiments, recognizing a detection signal and backtracking this detection signal occurs within the same data. The detector data obtained and shared by the sensor is stored in the recording device primarily in order to be retrieved for the backtracking. The initial recognition of the detection signal is advantageously performed with detector data filtered by some threshold, whereby one aim is to reduce this threshold in order to increase the probability of declaration. As a drawback, this leads to a higher number of objects to be classified and therefore to a higher false alarm rate. If the detection signal crosses the declaration threshold value (which, depending on the embodiment, may just coincide with the threshold for recognition), the backtracking advantageously traces the detection signal back in time with a much lower threshold than the threshold employed for initial recognition. This could be done because the position of the potential threat is now known and only a small area around this threat has to be investigated in the image. Advantageously, the backtracking therefore runs past the time of the initial recognition gathering more information caused by the reduced detection threshold compared to the initial recognition. This additional information obtained through the backtracking process facilitates the classification of the potential missile that causes the detection signal thus reducing the above-mentioned disadvantages of the reduced detection threshold for the initial recognition (high number of objects, high false alarm rate). Besides the fact that a position of the potential missile may be verified more accurately, the focus is on the benefit that the missile warner can issue the warning message, or an alarm, more quickly, while at the same time also reducing the false alarm rate. Also, the distance to the furthest detection will be extended by the reduced backtracking detection threshold which could, in some cases, allow the determination of the launching point of the missile.

It is understood that the recording device and the evaluation unit may comprise several components, and that they may be at least partially integrated into the sensor. Thus, a comparison with threshold values may be performed within the sensor itself. Also, storing detector data may optionally take place within the sensor.

The previously used adjective "potentially" refers in particular to potentially dangerous missiles such as projectiles or rockets. Such objects generate signals that must be distinguished from other signals (e.g. a stationary background). It is likewise understood that the term "missile" shall encompass all flying objects that may represent a threat.

The terms "pre-classification" and "classification" used above are to be understood in a broad sense. Therefore, the pre-classification or the classification may e.g. merely include the detection of an intensity maximum in the detector data, and does not necessarily have to determine the precise features of the missile.

The previously employed term "declaration threshold value" does not necessarily refer directly to an intensity of image points received from the sensor. Rather, at least in the evaluation unit, an analysis of the detected events is performed (e.g. over time), such that the declaration threshold may refer to a derived quantity (as e.g. to how fast the intensity of image points changes over time).

Optionally, the evaluation unit is configured to perform the pre-classification and the classification by means of detector data and/or stored detector data of a single detector. The evaluation unit may also be configured to perform the pre-classification of the detector data and the classification of the stored detector data of a single sensor.

In particular, the missile warner may, in fulfilling its function, operate with a detector data set of a single detector, by which an increased verification speed or generally a faster output of an alarm may be achieved. However, it is to be understood that, depending on requirements of the respective application, detector data sets of several detectors (e.g. in different spectral ranges) may be combined. Also, in this case, temporal backtracking occurs, according to further embodiments, within the same detector data (as the terms "detector data" and "stored detector data" only refer to data directly from the sensors, or to data from the same sensors held in the recording device, respectively), and advantageously traces the detection signal back in time beyond the initial recognition. If several sensors are present, "detection data" and "stored detection data" refers to the data of these sensors collectively. The option merely states that the system may be employed for a single sensor, or in fact for each sensor of a missile warner individually.

Optionally, the evaluation unit is configured to issue an alarm upon the verification of a potential missile and/or after the detection signal has reached a further declaration threshold value, wherein this further declaration threshold value is higher than the declaration threshold value for the warning signal.

The triggering of the warning or the alarm may follow immediately after the determination that the respective detection threshold value has been exceeded. The concrete choice of the (further) detection threshold poses an optimization problem for combining a low false alarm rate with a high reliability (a high POD). For example, the declaration threshold value may be at thirty (30), and trigger a pre-warning (higher FAR at higher POD). At a further declaration threshold value of 70, an alarm may be issued (low FAR at low POD).

Optionally, the evaluation unit is configured to recognize and to trace (track), during the pre-classification, within the detector data a detection signal which is above a specific threshold value but still below the declaration threshold value.

Optionally, the sensor and the evaluation unit are further configured to capture, during detection, a position or a direction of the potential missile. The evaluation unit may further be configured to analyze the detector data and/or the stored detector data in a range around the position or the direction.

Here and in the following, a position is to be understood to also mean the position within the detector data, and not necessarily the three global spatial coordinates. Because the sensor "looks" in a certain direction, this position in general always defines a specific direction. The range around the position or direction is to be understood in particular as obtained by spatial filtering, in that only areas in a closer vicinity of the detected position are analyzed. It is emphasized that, according to further embodiments, the detector data and the stored detector data originate both from the same sensor, or possibly set of sensors, and that the stored detector data is held in the recording device in particular for the purpose of backtracking the detection signal at a lower threshold.

Optionally, the evaluation unit is further configured to utilize, after generating the warning signal, information of the detection signal obtained during the pre-classification for the classification. While it may be known in the state of the art, as e.g. in DIRCM systems, to use information about the potential missile collected in the pre-classification for a classification (which runs forward in time, pinning down features of the pre-classified potential missile to a greater extent), the difference is that the classification, according to further embodiments, includes the backtracking of the detection signal backwards in time, within the stored detection data filtered at a lower threshold value. The features of the potential missile may hence be primarily employed to discern the detection signal from clutter and background noise present due to the low threshold value.

The information can include, for example, the position of the detection signal which triggered the warning signal, or the change in the position or the intensity of the detection signal over time. The information can be used during the classification to restrict parameters for tracking the detection signal within the stored detector data. This restriction of parameters may for example include a restriction to a range around the position or direction of the detection signal. The restriction of parameters strongly facilitates the backtracking of the detection signal of the observed potential missile within the detector data, such that a much lower threshold value can be used for the backtracking within the stored detector data. Usually, a low threshold value leads to an undesirably high false alarm rate. However, this false alarm rate is here significantly reduced by the restriction of the parameters.

Optionally, the evaluation unit is configured to perform the backtracking over time until a possible launch event, wherein the launch event is a temporally localized maximum in the stored detection data, or an earliest sensor signal within the backtracking.

While systems in the state of the art may also employ data from a past trajectory of the potential missile, again the difference, according to further embodiments, is that the evaluation unit traces the detection signal back through time, within the stored detector data and with different search parameters. Especially if the backtracking runs beyond the initial recognition of the detection signal, the evaluation unit is thus configured to discover the hitherto unnoticed part of the detection signal before that time.

Optionally, the evaluation unit is further configured to store the detector data held in the recording device for a predefined amount of time, and/or to delete the detector data after a predefined amount of time, wherein the predefined amount of time depends on a flight time which is to be expected for the potential missile to reach a target object that is to be warned by the missile warner.

Storing the detection data in the evaluation unit is necessary for the backtracking. The predetermined amount of time for the recording can depend on an expected duration of flight of the potential missile to a target object which is to be warned by the missile warner. For example, the predetermined amount of time can be in a range between ten and sixty seconds (10-60 s), or between fifteen and fifty seconds (15-50 s), or approximately twenty seconds (~20 s), or approximately thirty seconds (~30 s). As is generally conventional, the term "deletion" should not necessarily be understood to mean physical deletion, but rather only a release for overwriting the corresponding data area. The specified time ranges are only given as examples. It is understood that the time range is in particular adjustable, and can be adapted to the specific circumstances and to the missiles to be expected, or respectively to their speed. Unlike conventional systems, it is emphasized that, according to further embodiments, the stored sensor data is held preemptively, in order to be scanned for a detection signal of a potential missile backwards in time to establish if it is actually presenting a threat, and not a false alarm.

Optionally, the evaluation unit is configured to compare, during the classification, at least sections of the detection signal in the stored detector data with a specific (known to the evaluation unit in advance) missile signature in order to classify the missile as potentially dangerous.

A potentially dangerous missile has a specific missile signature. The evaluation unit can compare, within the scope of the classification, this missile signature with known missile signatures in order to improve the verification of the potential missile and thereby reduce the probability of false alarms.

Optionally the recording device is further configured to only store detector data which are above a threshold value. The signals may further be continuously compressed and stored as compressed image data. Optionally, the sensor is configured to perform a local or global segmentation in real-time, and to transmit only object data to the evaluation unit. Contrary to image data, object data may e.g. be data suited to identify objects or their features (such as e.g. what the object is, and where it is).

Storing detector data only above a threshold value, as well as the compression, may serve to reduce the amount of stored detector data, and/or may anticipate the implementation of a threshold value in the backtracking process. The transmission of object data can facilitate verification.

The present invention further relates to a method for warning of a missile. The method includes the following steps:
 continuously storing detector data of a sensor in a recording device for a predefined amount of time;
 detecting a potential missile by means of identification of a detection signal;

generating a warning signal of a potential missile after the detection signal exceeds a declaration threshold value; and verifying the potential missile by temporal backtracking of the detection signal, using the detector data stored in the recording unit.

The present subject matter therefore relates to a missile warning whose generation does not require an emission of signals (passive warner). Filters may be present for filtering the wavelength range to be expected.

Optionally, the method further includes the following step:

issuing and relaying an alarm after verifying the potential missile and/or after the detection signal has attained a threshold value above the declaration threshold value.

Optionally, the method comprises employing information from the preceding identification of the detection signal for verifying the potential missile.

Optionally, the method further includes performing the temporal backtracking until a possible launch event, wherein the launch event is a temporally localized maximum within the stored detector data, or an earliest possible sensor signal obtained in the backtracking process.

BRIEF DESCRIPTION OF THE SEVERAL VIEWS OF THE DRAWING

Embodiments of the present invention will be better understood from the following detailed description and the corresponding figures, which, however, should not be construed as limiting the disclosure to the specific embodiments, but are intended solely for explanation and better understanding.

DETAILED DESCRIPTION OF THE FIGURES

Figure 1:
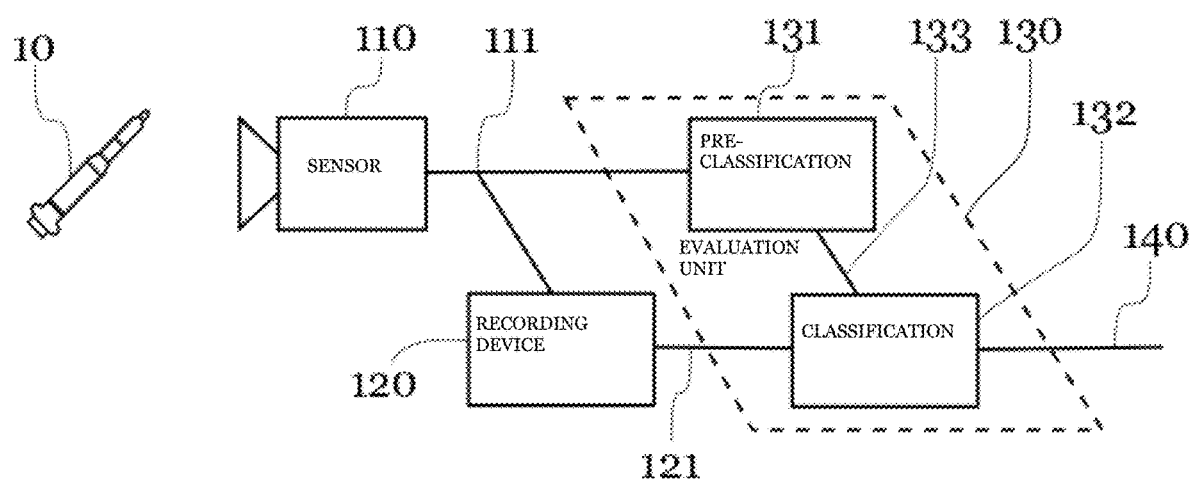
FIG. 1 is a schematic diagram for a missile warner according to a first embodiment of the present invention.

FIG. 1 depicts a diagram for a missile warner according to an embodiment of the present invention. The missile warner includes a sensor 110, a recording unit 120, and an evaluation unit 130 (indicated by the dashed parallelogram). The sensor 110 is configured to detect a potential missile 10. The sensor 110 conveys received signals as detector data 111 both to the recording device 120 as well as to the evaluation unit 130. The recording device 120 is configured to continuously store (as a rolling storage) the detector data 111 for a predefined amount of time.

Figure 2A:
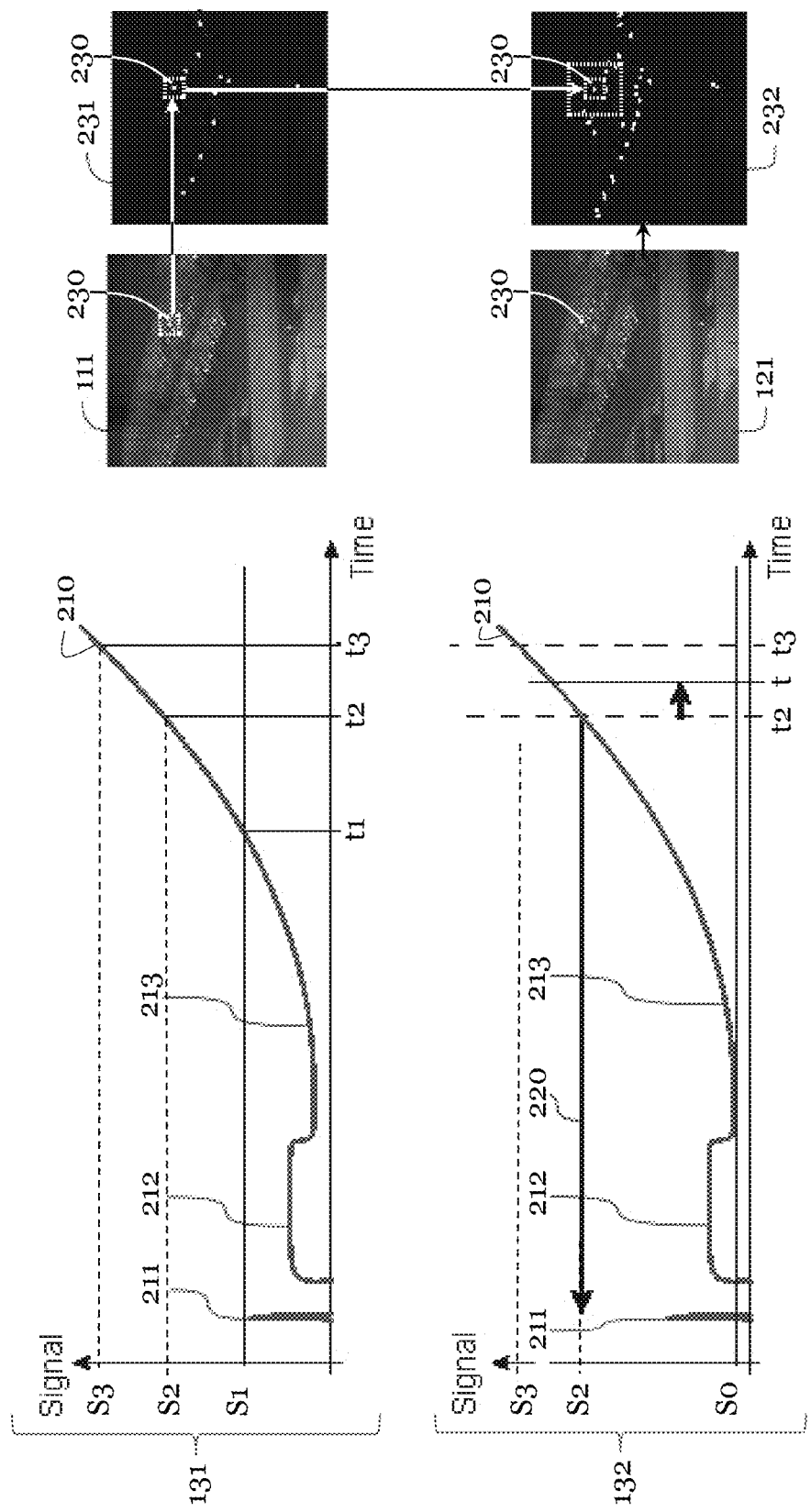
FIG. 2A shows a missile signature with the reactions of a missile warner according to the first embodiment of the present invention.

The evaluation unit 130 is configured to fulfil two functions, which are here represented by rectangles in the interior of the evaluation unit 130: Firstly, as further shown in FIG. 2A, the evaluation unit 130 is configured for a pre-classification 131, in which it receives the detector data 111, finds, within the detector data 111, detection signals 230 generated by a potential missiles 10, and triggers, after a detection signal 230 has exceeded a predefined declaration threshold S2, a warning signal 133. Optionally, this function is configured to recognize, in the detector data 111, a detection signal 230 above a specific threshold S1, to track the detection signal 230, and to only trigger a warning signal 133 once the detection signal 230 has attained the detection threshold value S2. Secondly, the evaluation unit 130 is configured for a classification 132, in which it performs, upon the warning signal 133, a verification of the potential missile 10 based on a backtracking 220 within the stored detector data 121. The backtracking 220 can be performed with a much lower threshold value S0. Optionally, the backtracking 220 may be supported by restricting the search parameters based on information contained in the previously identified detection signal 230, wherein the restriction may e.g. include a position or a direction and/or the so far detected chronological sequence of the detection signal 230. If the potential missile 10 is verified as such by means of the classification 132, or if the detection signal 230 exceeds a higher threshold value S3, the evaluation unit 130 issues an alarm 140. FIG. 2A illustrates a mode of operation of an embodiment according to the present invention.

The left part of FIG. 2A displays two copies, one above the other, of a schematic example for a missile signature 210 in chronological sequence (signal against time). The missile signature 210 may e.g. be an optical signal generated by a missile 10, wherein the optical signal may be detectable in the visible, IR, or UV spectral range. The missile signature 210 includes, initially, a launch section 211, which is generated e.g. by a start of a rocket or a launch of the missile 10. This is followed by an acceleration section 212 (so-called booster section), which corresponds to an acceleration phase of the missile 10 and is associated with an increased intensity of the generated radiation. Finally, the missile signature 210 includes a flight section 213 (a so-called sustainer signal), which is generated over the normal flight time.

In the left part of FIG. 2A, a field on the upper left displays the detector data 111, and a field on the lower left displays the stored detector data 121; furthermore, a field 231 on the upper right depicts the detector data 111 after filtering out data below the threshold value S1 of the pre-classification 131, and a field 232 on the lower right depicts the stored detector data 121 after filtering out data below the threshold value S0 of the classification 132.

The upper part of the figure exemplifies the pre-classification 131 of the evaluation unit 130. The missile signature 210 is recognized as a detection signal 230 by the evaluation unit. The detection signal 230 exceeds the threshold value S1 at time t1, which in this example triggers a tracking of the missile signature 210 by the evaluation unit 130 within the detector data 111. As the missile signature 210 exceeds the declaration threshold value S2, here at time t2, the evaluation unit 130 generates a warning signal 133.

The lower part of FIG. 2A exemplifies the classification 132 by the evaluation unit 130. After the warning signal 133 is triggered at time t2, the evaluation unit 130 performs a backtracking 220 of the missile signature 210 within the stored detector data 121. The backtracking 220 includes an analysis of the detection signal 230 in the stored detector data 121 above a low threshold value S0. A high false alarm rate resulting from the low threshold value S0 may e.g. be compensated for by restricting the analysis of the detector data 121 to a limited range around the position of the detection signal 230. Optionally, the backtracking 220 may include a comparison with a missile signature 210 which is known to the evaluation unit 130, and/or it may be improved and accelerated via further information available through the pre-classification 131 of the detection signal 230, such as e.g. the change of the detection signal 230 over time as detected in the pre-classification 131.

Depicted is a situation in which the detection signal 230, generated by the potential missile 10 and included in the detector data 121, can be verified with sufficient accuracy by the backtracking 220 to correspond to a missile signature 210 of a dangerous missile 10. The backtracking 220 takes the time from t2 to t. The verification is completed at time t, and the evaluation unit 230 triggers an alarm 140, which is passed on to a superordinate system.

For better understanding a time t3 is marked in FIG. 2A, at which the evaluation unit 130 would have verified the missile signature 210 by following a method without backtracking. Optionally, the evaluation unit 130 may be designed to trigger an alarm 140 once the threshold value S3 is reached (here at time t3), if the backtracking 220 should not have led to a successful verification by the time t3.

It should however be emphasized again that, according to further embodiments, by means of the backtracking 220, the declaration of the potential missile 10 as an actual threat can usually be achieved much before the time t3. Also, while it would in principle also be possible to scan the detector data 111 directly with two different threshold values S0, S1, such a procedure would result firstly in a much greater processor load, and secondly still in a high FAR, due to the scanning at the lower threshold value S0. It is therefore in particular the idea of the backtracking 220, i.e. tracing potential missiles 10 backwards in time, which establishes the efficiency of the present missile warner.

Figure 2B:
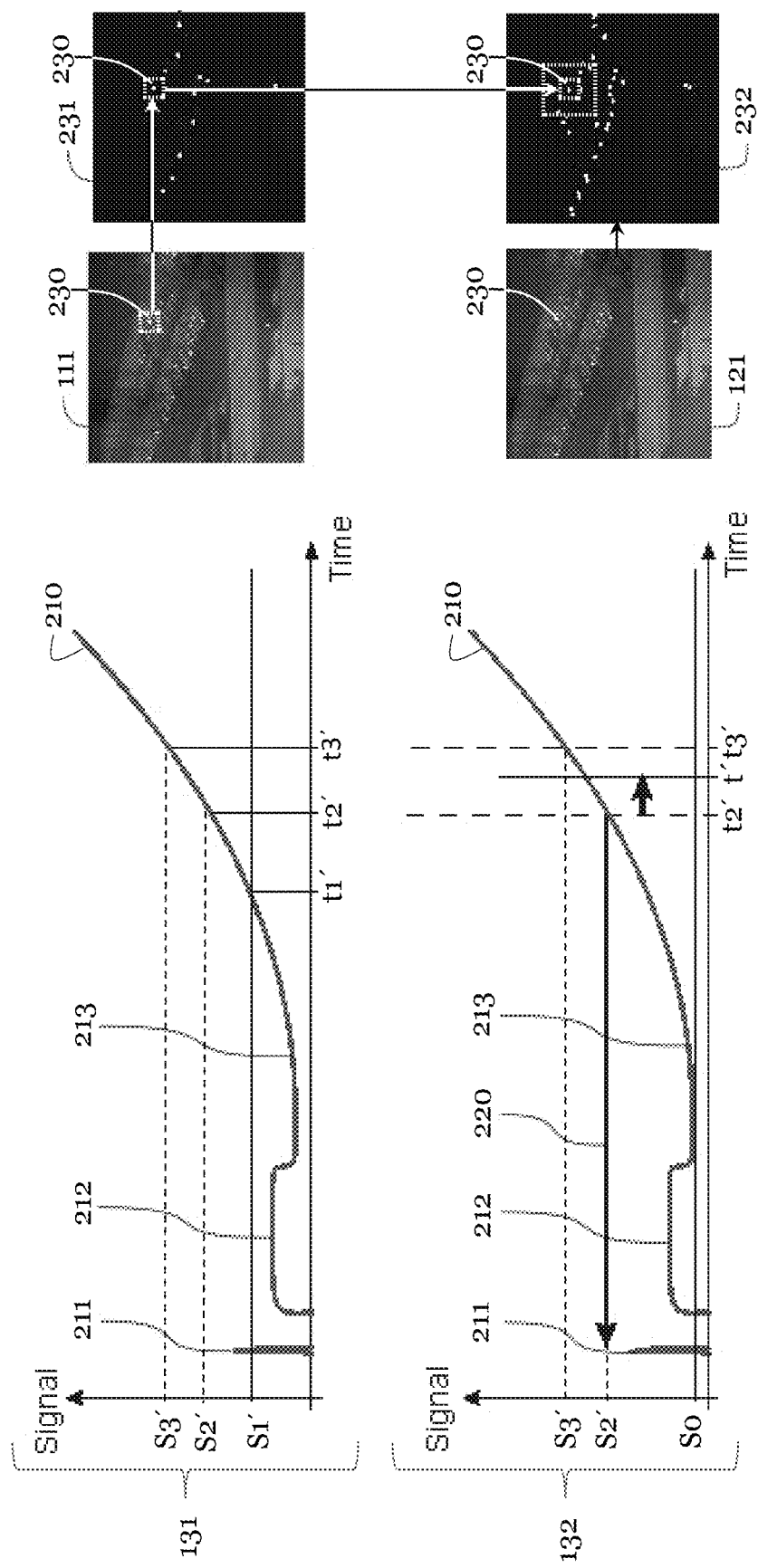
FIG. 2B shows a missile signature with the reactions of a missile warner according to a second embodiment of the present invention.
Figure 3:
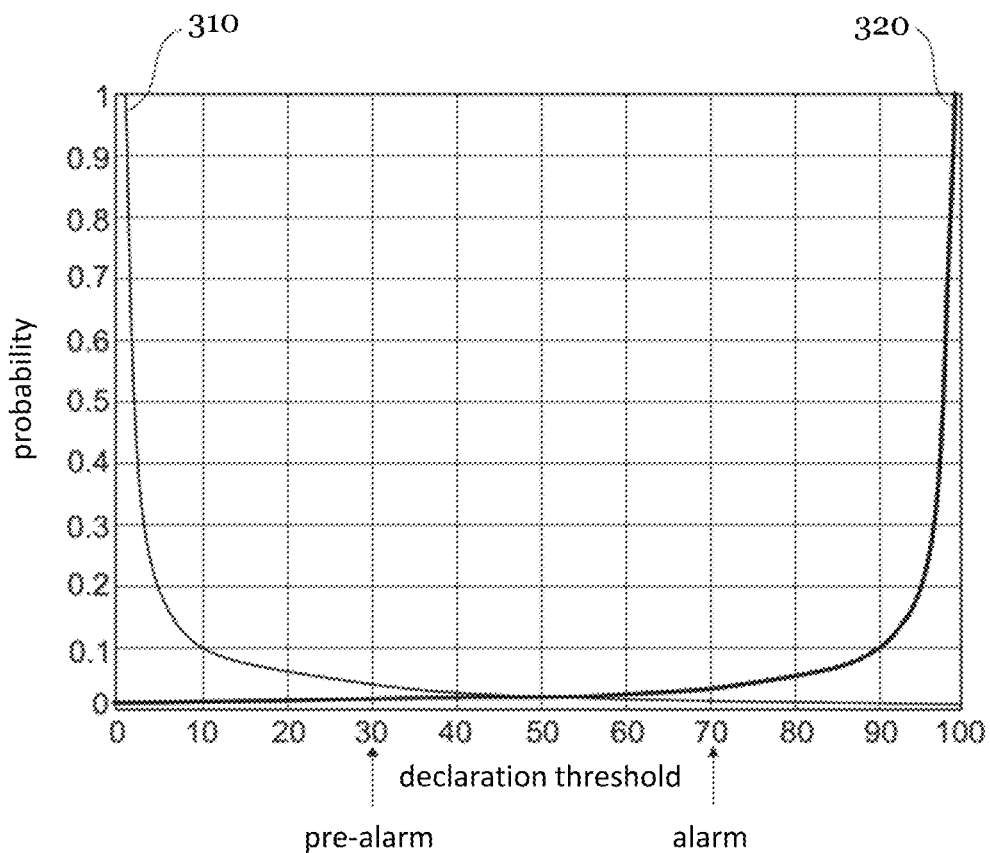
FIG. 3 shows a schematic relationship between FAR and POD.

FIG. 2B illustrates a mode of operation of a further embodiment according to the present invention. The figure is organized as FIG. 2A, but in FIG. 2B the detection thresholds S1, S2 and S3 of the evaluation unit 130 are reduced to S1', S2' and S3'. This increases the number of detection signals 230, and also increases the probability of false alarms. Detection and reaching the declaration threshold S2' for the output of the warning signal 133 both take place earlier for the same missile signal 210 (namely, at times t1' and t2' instead of t1 and t2). The backtracking 220 again allows a verification of the missile signal 210 due to the lower threshold value S0, and time t' of the output of an alarm 140 is again before the time t3', at which the detection signal 230 reaches the higher threshold value S3' and the evaluation unit 130 issues the alarm 140. In comparison to the situation in which the missile warner works without backtracking 220, and only outputs an alarm 140 when the detection signal 230 has reached the original threshold value S3 (this corresponds to the situation without backtracking 220 shown in FIG. 2A), the embodiment according to FIG. 2B leads to an earlier alarm at the same false alarm rate.

The features of the invention as disclosed in the description, the claims, and the figures can be essential for the implementation of the invention both individually and in any combination.

LIST OF REFERENCE NUMBERS

The following table lists the reference numbers and associated part name.
10 potential missile
110 sensor
111 detector data
120 recording device
121 stored detector data
130 evaluation unit
131 pre-classification for the identification of a detection signal
132 classification for the backtracking of a detection signal
133 warning signal
140 alarm
210 missile signature
211 launch signal
212 acceleration signal
213 flight signal
230 detection signal
231 detector data above the threshold value S1
232 detector data above the threshold value S0
310 false alarm rate (FAR)
320 probability of non-detection (1-POD)
S0, S1, S2, S3 threshold values
t1, t2, t3 times at which the missile signature attains the threshold values S1, S2, S3
t time at which the backtracking 220 is completed.

The invention claimed is:

1. A missile warner, comprising:
a sensor for detecting a potential missile;
a recording device for a continuously storing detector data of the sensor for a predefined amount of time;
an evaluation unit, configured
to receive, in a pre-classification, detector data from the sensor, to recognize within the detector data a detection signal of the potential missile and to compare the detection signal with a declaration threshold value, and to generate, after the detection signal has exceeded the declaration threshold value, a warning signal of the potential missile, and
to perform, in a classification, upon the presence of the warning signal, a verification of the potential missile by temporal backtracking of a corresponding detection signal, by using a stored detector data in the recording device,
wherein the evaluation unit is further configured to recognize and trace, during the pre-classification, within the detector data a detection signal above a specific declaration threshold value, the specific declaration threshold value is below the declaration threshold value.

2. The missile warner according to claim 1, wherein the evaluation unit is configured to perform the pre-classification and the classification by using at least one of the detector data and the stored detector data of a single sensor.

3. The missile warner according to claim 1, wherein the evaluation unit is further configured to issue an alarm, the alarm being at least one of:
an alarm upon the verification of the potential missile, and
an alarm after the detection signal has attained a further declaration threshold value, wherein the further declaration threshold value is higher than the declaration threshold value of the warning signal.

4. The missile warner according to claim 1, wherein:
the sensor or the evaluation unit are further configured to capture, during detection, a position or a direction of the potential missile, and
the evaluation unit is configured to analyze the detector data and/or the stored detector data for a range around the position or the direction.

5. The missile warner according to claim 1, wherein the evaluation unit is configured to use, after generating the warning signal, information obtained from the detection signal during the pre-classification for the classification.

6. The missile warner according to claim 1, wherein the evaluation unit is configured to perform the temporal backtracking over time until a potential launch event, a launch event being at least one of a temporally localized maximum in the stored detector data and an earliest possible sensor signal obtained in the backtracking.

7. The missile warner according to claim 1, wherein a potentially dangerous missile displays a specific missile signature, and wherein the evaluation unit is further configured to compare, during the classification, at least sections of the detection signal within the stored detection data with the specific missile signature in order to classify the missile as potentially dangerous.

8. The missile warner according to claim 1, wherein said missile warner is a passive missile warner.

9. A missile warner, comprising:
a sensor for detecting a potential missile;
a recording device for a continuously storing detector data of the sensor for a predefined amount of time;
an evaluation unit, configured
   to receive, in a pre-classification, detector data from the sensor, to recognize within the detector data a detection signal of the potential missile and to compare the detection signal with a declaration threshold value, and to generate, after the detection signal has exceeded the declaration threshold value, a warning signal of the potential missile, and
   to perform, in a classification, upon the presence of the warning signal, a verification of the potential missile by temporal backtracking of a corresponding detection signal, by using a stored detector data in the recording device,
wherein the evaluation unit is further configured to store the stored detector data of the recording device for at least one of a predetermined amount of time and time to delete the stored detector data after a predefined time, the predefined time depending on a flight duration to be expected until the potential missile reaches a target object, the target object being warned by the missile warner.

10. A missile warner, comprising:
a sensor for detecting a potential missile;
a recording device for a continuously storing detector data of the sensor for a predefined amount of time;
an evaluation unit, configured
   to receive, in a pre-classification, detector data from the sensor, to recognize within the detector data a detection signal of the potential missile and to compare the detection signal with a declaration threshold value, and to generate, after the detection signal has exceeded the declaration threshold value, a warning signal of the potential missile, and
   to perform, in a classification, upon the presence of the warning signal, a verification of the potential missile by temporal backtracking of a corresponding detection signal, by using a stored detector data in the recording device,
wherein the evaluation unit is configured to only store detector data generated in the sensor which are above a threshold, and
wherein the sensor is configured to perform a local or global segmentation in real-time, and to transmit only object data to the evaluation unit.

11. The missile warner according to claim 10, wherein the evaluation unit continuously compresses the detector data and to store the data as compressed image data.

* * * * *